(12) United States Patent
Walker

(10) Patent No.: US 7,128,513 B2
(45) Date of Patent: Oct. 31, 2006

(54) SCREW AND DRIVER THEREFOR

(76) Inventor: Eric Walker, t/a Walker Properties Popular Nurseries Main Street, Swallownest Sheffield S26 4TZ (GB)

( * ) Notice: Subject to any disclaimer, the term of this patent is extended or adjusted under 35 U.S.C. 154(b) by 0 days.

(21) Appl. No.: 10/519,597

(22) PCT Filed: Jun. 27, 2003

(86) PCT No.: PCT/GB03/02740

§ 371 (c)(1),
(2), (4) Date: Dec. 28, 2004

(87) PCT Pub. No.: WO2004/005731

PCT Pub. Date: Jan. 15, 2004

(65) Prior Publication Data

US 2005/0268757 A1    Dec. 8, 2005

(30) Foreign Application Priority Data

Jul. 4, 2002    (GB)    .................... 0215376.5

(51) Int. Cl.
*F16B 23/00* (2006.01)
(52) U.S. Cl. .................. 411/403; 411/404; 411/405; 411/408; 81/460
(58) Field of Classification Search ............ 81/460; 411/403–405, 408
See application file for complete search history.

(56) References Cited

U.S. PATENT DOCUMENTS 3,363,500 A * 1/1968 Simko ................. 411/403
5,279,190 A * 1/1994 Goss et al. ............ 81/460

FOREIGN PATENT DOCUMENTS

| AT | 398 231 | 10/1994 |
|---|---|---|
| DE | 299 02 677 | 2/1999 |
| FR | 2 585 609 | 2/1987 |
| GB | 1 491 515 | 11/1977 |
| SU | 438814 | 1/1975 |
| WO | WO 00/71301 | 11/2000 |

OTHER PUBLICATIONS

Copy of Search Report for British Priority Appl. No. 0215376.5 dated Sep. 25, 2002.
Copy of International Search Report for International Appl. No. PCT/GB03/02740 completed Sep 8, 2003.

* cited by examiner

*Primary Examiner*—Lee D. Wilson
*Assistant Examiner*—Anthony Ojini
(74) *Attorney, Agent, or Firm*—Alston & Bird LLP

(57) ABSTRACT

A screw (10) has a threaded shank (12) and a head (14). The head has a recess (18) that comprises three lobes (18a, b, c). Each lobe is separated by a curved drive flange (20a, b, c). A driver (100) has a drive tip (114) that fits the recess of the screw.

8 Claims, 6 Drawing Sheets

SCREW AND DRIVER THEREFOR

BACKGROUND OF THE INVENTION

1) Field of the Invention

The present invention relates to screws and drivers therefor, and particularly woodscrews having a countersunk head.

2) Description of Related Art

Traditionally, countersunk woodscrews are provided with a straight slot drive recess, but various forms of crossed slots, culminating in Philips® and Posidriv® forms of drive recess, have been developed.

However, whatever form of driver/recess is employed, an axial pressure is almost invariably required (and a pressure, moreover, that increases with increasing torque applied) in order to counter the tendency of drivers to "cam-out" of engagement with the screw recess.

Furthermore, as screws get larger it is usually necessary to increase the dimensions of the recess so that greater torque can be transmitted. However, this usually involves a different and bigger driving tool.

FR-A-2585609 discloses a drive system comprising a driving and a driven element each having a circular end face with upstanding sectors the edges of which are undercut. Consequently, when the driving and driven element are engaged face to face with their respective sectors interdigitating, the undercut edges transmit rotary drive between them with no cam-out. However, forming undercut edges on the head of a screw is problematic.

SU-A-438814 discloses a screw with a triangular recess, and a driver therefor. The recess appears to be undercut so that, after the driver has been inserted and turned through a small angle, undercut ledges on the driver engage with the recess undercuts to prevent disengagement. Again, forming undercut edges is problematic.

BRIEF SUMMARY OF THE INVENTION

It is an object of the present invention to provide a screw, and driver therefor, wherein the screw has a recess form that reduces the tendency of the driver to cam-out when torque is applied. Moreover, the arrangement should be simple, and have the capacity to permit several sizes of screw to be driven by the same driver.

In accordance with a first aspect of the present invention, there is provided a screw having a driving recess in a top face of its head, the recess comprising at least two recess-lobes evenly spaced around a longitudinal axis of the screw, and driving flanges joining adjacent lobes, wherein each flange in transverse section is an arc convex with respect to the longitudinal axis, has sides which are parallel said longitudinal axis and has a tangent which is radial with respect to said longitudinal axis, the floor of said recess-lobes being inwardly inclined from their junctions with said top face towards said longitudinal axis.

Although two recess-lobes, and four or more recess-lobes are within the ambit of the present invention, three is the preferred number. This facilitates finding the correct orientation of a driver for the screw since the maximum angle through which they may be misaligned with respect to one another is 60 degrees of rotation, as opposed to 90 degrees of rotation for a two-lobe recess. On the other hand, four-lobe recesses still have the capacity for 45 degrees of misalignment, so that the benefit in this respect of more recess-lobes diminishes with increasing number of them. However, three recess-lobes gives a preferred balance of material as between the driver and screw, as opposed to more than three recess-lobes.

Preferably, the arc is substantially circular.

Preferably, said tangent is radial at a distance from where the arc meets each lobe.

Preferably, the lobes are part-circular in section at their junctions with said top face, centred on the longitudinal axis.

Preferably, the centre of each arc is on a circle that is centred on the longitudinal axis, the radius of which circle is the same as or greater than the radius of the lobes, preferably the same.

Preferably, the radius of each arc is between 60 and 80% of the radius of the lobes, ideally about 67%.

Preferably, the profile of the recess reduces at a constant rate with increasing depth. The floor of the recess-lobes is inclined at angle of between 30 and 60 degrees, ideally about 45 degrees.

In another aspect, the present invention provides a driver for a screw defined above. A driver comprises a drive tip having at least two drive elements evenly spaced around a longitudinal axis of the driver, and scallops joining adjacent drive elements, wherein each scallop in transverse section is a concave arc that has sides which are parallel said longitudinal axis, and has a tangent which is substantially radial with respect to the longitudinal axis, front faces of said drive elements being inclined from a point coincident with said longitudinal axis.

The profile of the driver is obviously arranged to correspond with the profile of the screw. Preferably, three drive elements are provided.

For a large range of screws, it desirable to have several size ranges of the recess and respective driver, each size being suited for a small range of screw sizes. That is to say, the recess in each screw of the small range being substantially the same. However, it is possible to reduce the depth of the recess for smaller sizes in each range so that the radius of the circle containing the junctions of said recess-lobes and top face of the screw reduces correspondingly. Also, for larger screws in each range, the depth of each recess may be deeper so that said floor drops perpendicularly from said top face before inclining towards said longitudinal axis. Thus the same driver can be employed to drive a variety of different sizes of screw within each size range. The effect of the change in depth of the recess is to alter the area of driving surfaces of the recess available to the driver, a larger area being provided for larger screws.

BRIEF DESCRIPTION OF THE SEVERAL VIEWS OF THE DRAWINGS

The invention is further described hereinafter, by way of example, with reference to the accompanying drawings, in which.

DETAILED DESCRIPTION OF THE INVENTION

Figure 1A:
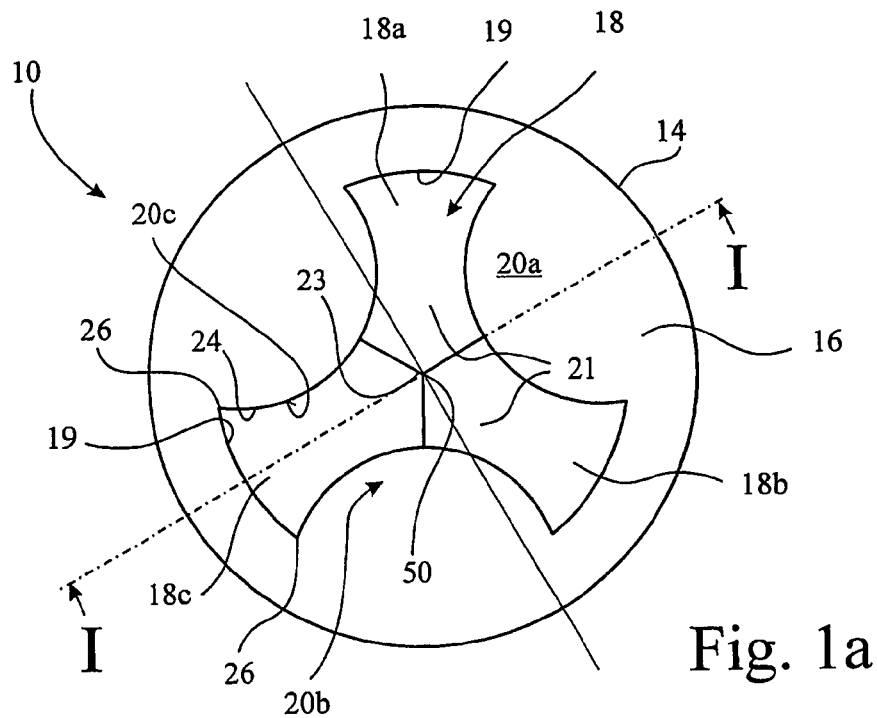
FIGS. 1a and b are a top view and a side view (partly in section along the line I—I in FIG. 1a) respectively of a countersunk woodscrew in accordance with the present invention.

With reference to FIGS. 1a and b, a screw 10 is shown in accordance with the invention having a threaded shank 12 and a countersunk head 14. The head 14 is provided in its top face 16 with a driving recess 18. The recess 18 comprises 3 lobes 18a,b,c having edges 19 which are circular in section, centred on a longitudinal axis 50 of the screw 10. Each lobe 18a,b,c is joined by a drive flange 20a,b,c.

The drive flanges 20a,b,c are each an arc of a circle, in section, tangents of which are radial with respect to the axis 50. The walls 24 of each drive flange are parallel the axis 50. They are centred on points substantially coincident with the circle that includes the edges 19. In this event, at the points 26 at which the walls 24 meet the edges 19, they do so at an acute angle so that the lobe-recess 18 between adjacent drive flanges 20 is swallowtail in form. The screw recess 18 can conveniently be referred to as a tri-arc recess.

Each lobe-recess 18a,b,c has a floor 21 which is flat and inclined from the junction 19 between the lobe-recess 18 and top face 16, inwardly and downwardly towards the longitudinal axis 50, where the floors of each lobe-recess meet at a point 23 coincident with the axis 50.

Figure 5A:
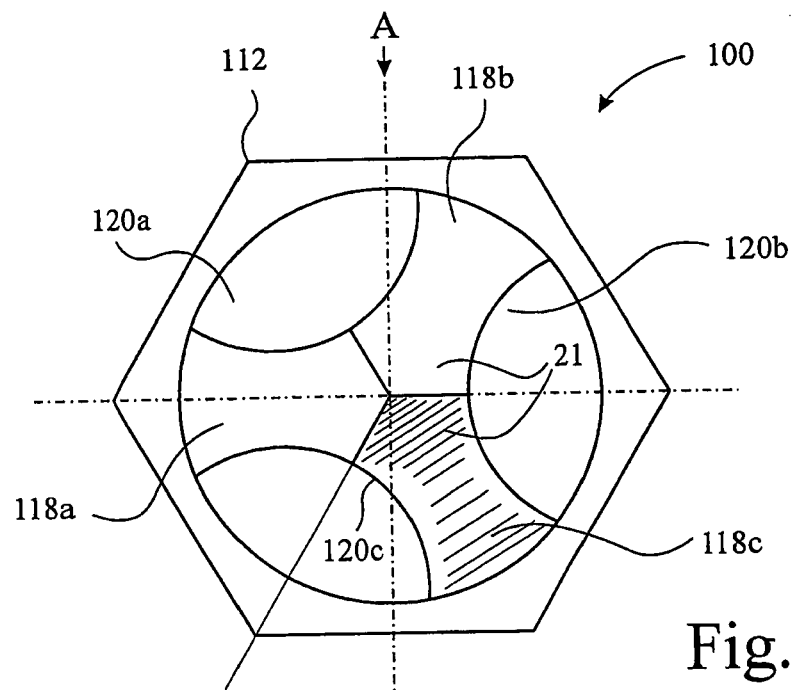
FIGS. 5 a and b are and end view and a side view (in the direction of Arrow A in FIG. 5a) of a driver for the screws of FIGS. 1 to 4.
Figure 5B:
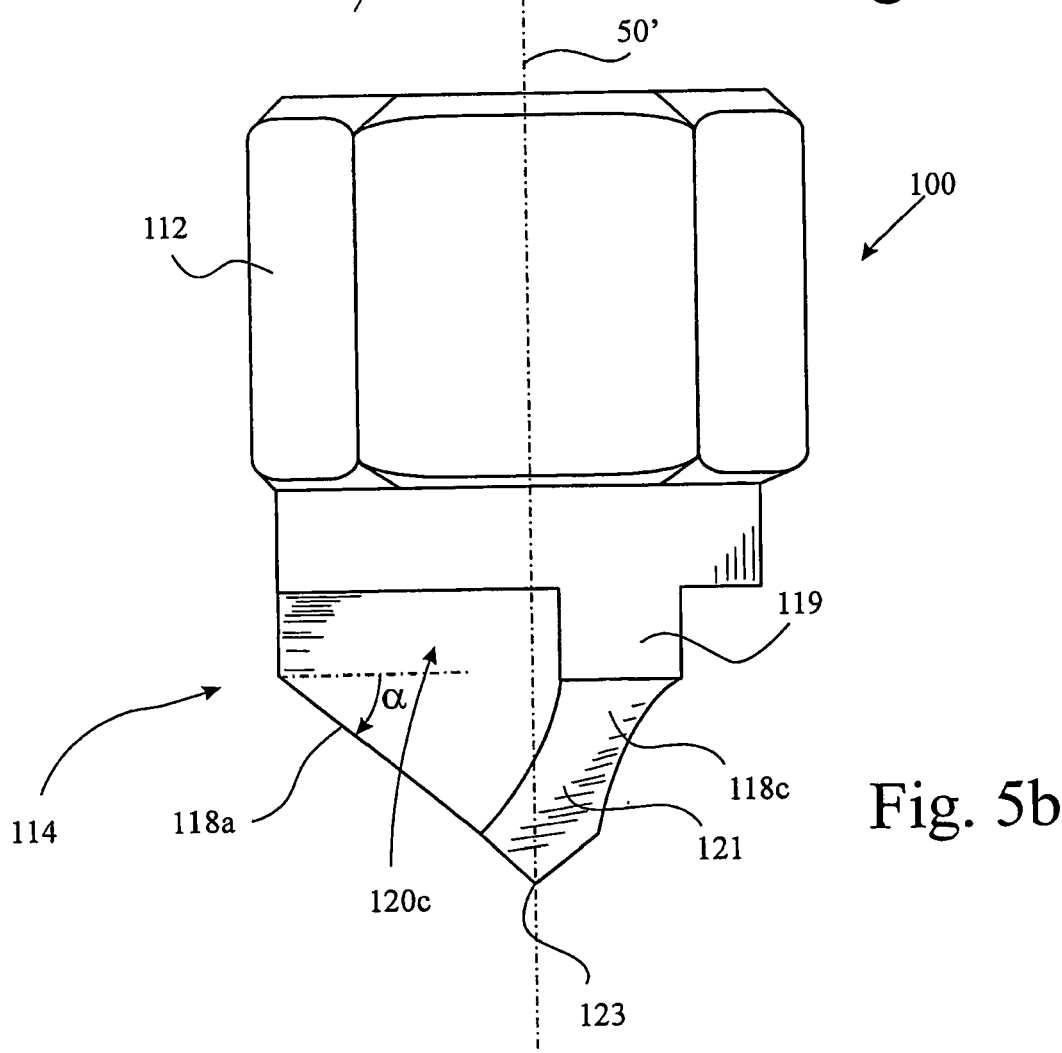

Turning to FIGS. 5a and b, a driver 100 is shown having a hexagonal section shank 112 for fitting in a conventional socket to rotationally drive the driver 100 about its longitudinal axis 50'. On the end of the shank 112 is a driving tip 114. The tip 114 comprises 3 drive elements 118a,b,c. Between each drive element is a scallop 120a,b,c. In transverse section, each scallop is concave forming an arc of a circle. Similarly, the external surface 119 of the drive element 118a,b,c lies on the arc of a circle centred on the axis 50'.

Each drive flange 118 has a flat front face 121, inclined from the side of the driving tip 114 to a point 123 coincident with the axis 50'.

Both the floors 21 and the faces 121 could have a different profile and could, for example, lie on the surface of a cone joining all three floors and faces.

The driving tip 114 is shaped to fit the recess 18 of the screw 10 so as to transmit drive from the driver 100 to the screw 10. Since the shape of the driver and recess is rotationally symmetrical, drive can be transmitted in either direction.

Both the recess and tip diminish in size with a cone angle α of about 45 degrees, although sharper angles of about 60 degrees are possible.

By virtue of the curved face of the scallops 120 and the mating surfaces of the drive flanges 20, a particularly tight fit between them is achievable. The scalloped drive elements 118 grip the drive flanges 20 at their edges in the dovetail extremity of the lobe-recesses 18. Moreover, because the drive elements 118 can wedge between adjacent drive flanges 18, slipping of the driver in the recess is resisted.

While the driving flanges 20a,b,c are shown as a circular arc, it is feasible that they could have the form of a different arc, the primary feature being the dovetail arrangement of the lobe-recesses.

The relative dimensions of the recess 18 can be maintained in larger or smaller screws, a different driver being required for each change in overall dimensions. However, with the same relative dimensions, there is still opportunity to adjust the recess size depending on the size of screw.

Figure 1B:
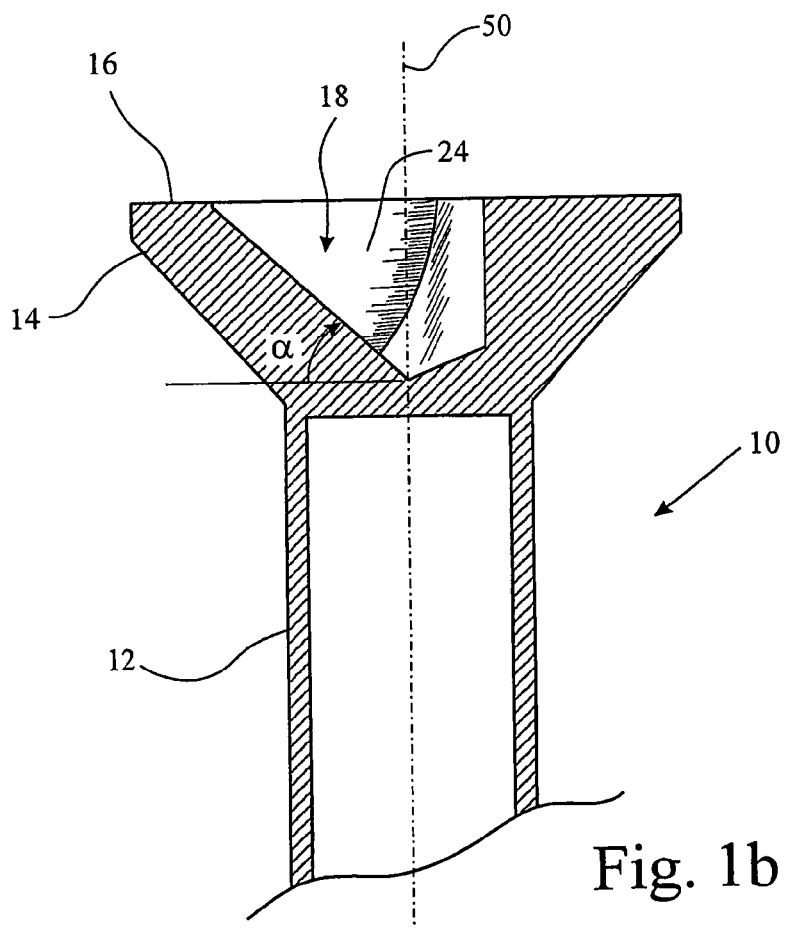
Figure 2A:
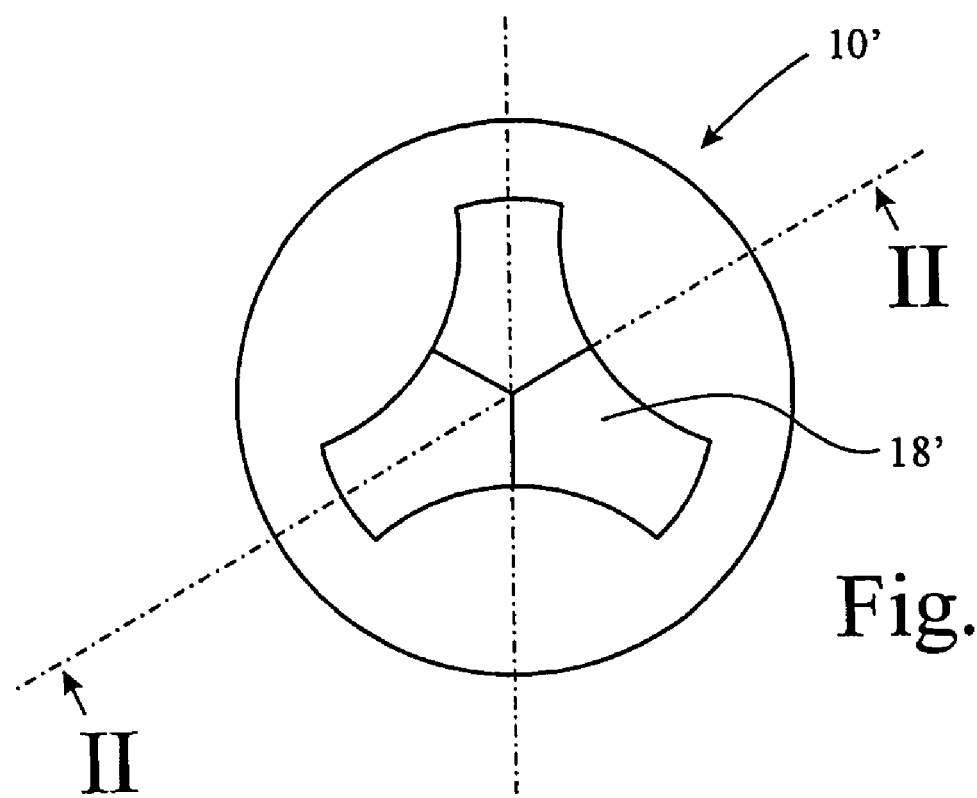
FIGS. 2a and b are similar views of a smaller screw in the same size range as that of FIG. 1 (FIG. 2b being partly in section along the line II—II in FIG. 2a)
Figure 2B:
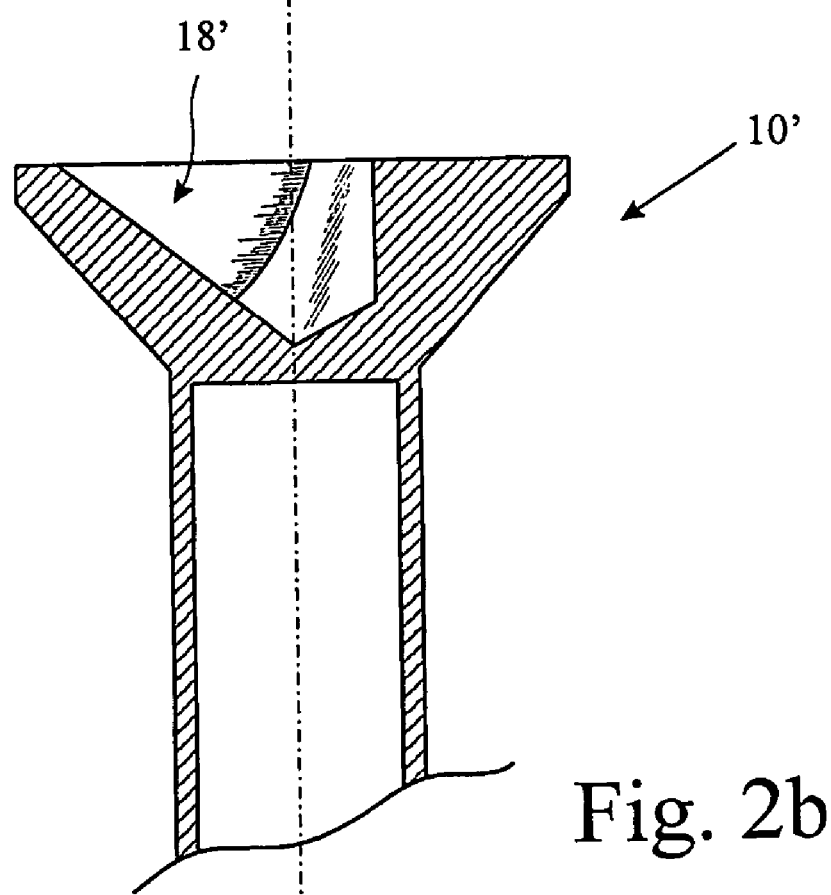
Figure 3A:
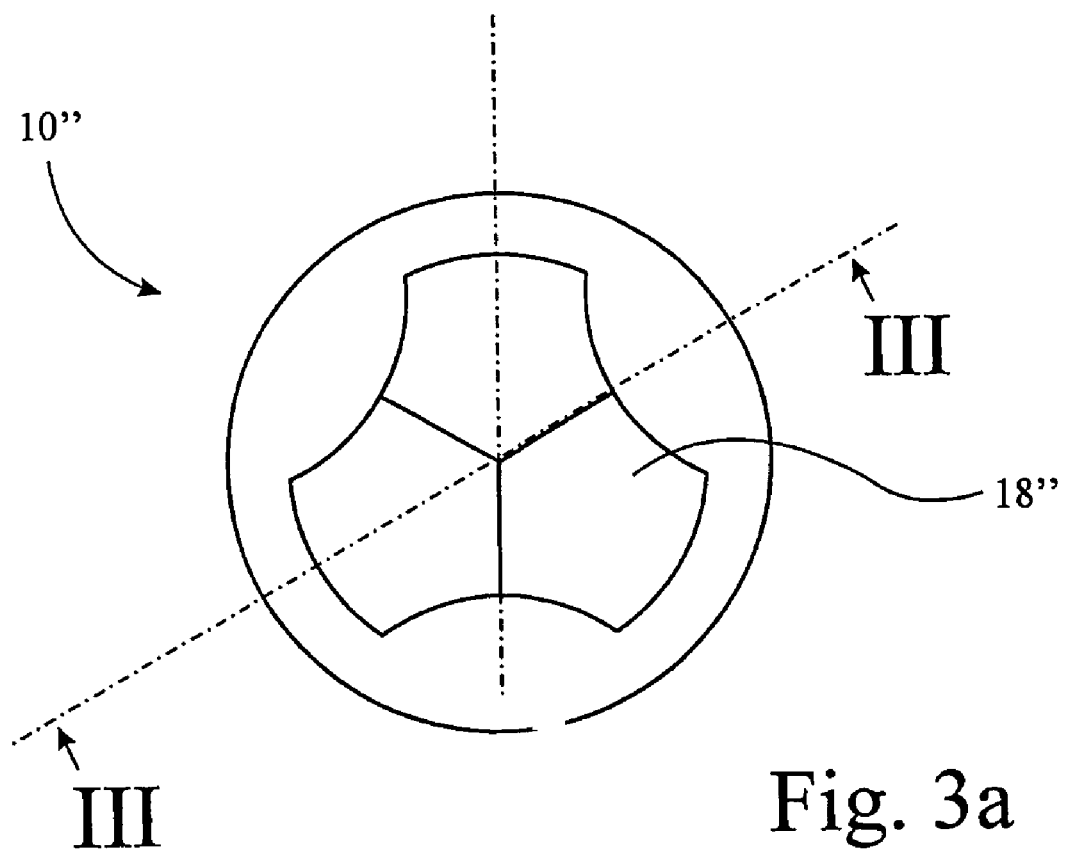
FIGS. 3a and b are similar views of a yet smaller screw in the same size range as that of FIG. 1 (FIG. 3b being partly in section along the line III—III in FIG. 3a)
Figure 3B:
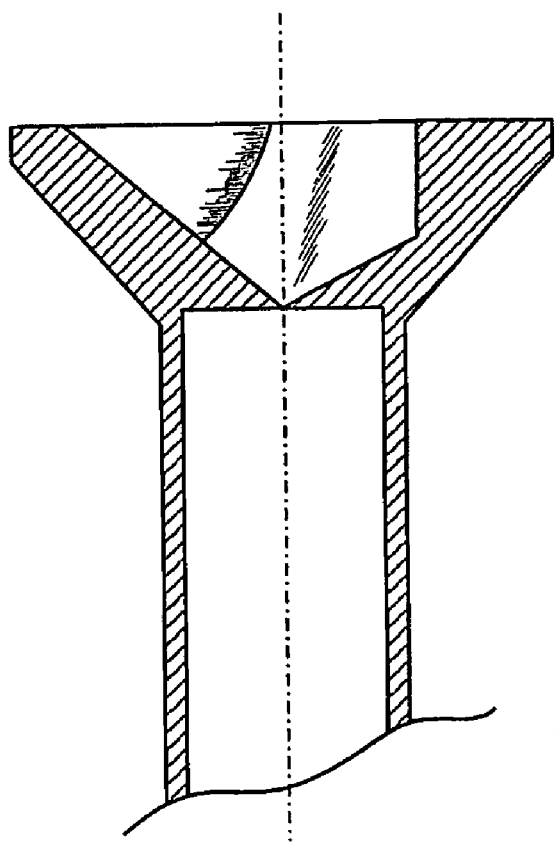

Thus in FIGS. 2a and b, a smaller screw 10' is shown having a recess the same as that of FIG. 1, but with less depth so that only the front tip of the driver 100 engages the recess 18'. This can be taken still further, as shown in FIGS. 3a and b where the recess 18" of screw 10" is even shallower. Clearly there is a reduction in drive surfaces available and the dovetail wedging feature is lost. However, with smaller screws less torque is required. Nevertheless, a balance has to be struck between the desire, on the one hand, to reduce the number of drivers that are required to accommodate as wide a range of screws as possible, and, on the other to improve cam-out resistance as much as possible. The latter desire militates towards using a profile as shown in FIG. 1 in each screw.

Figure 4A:
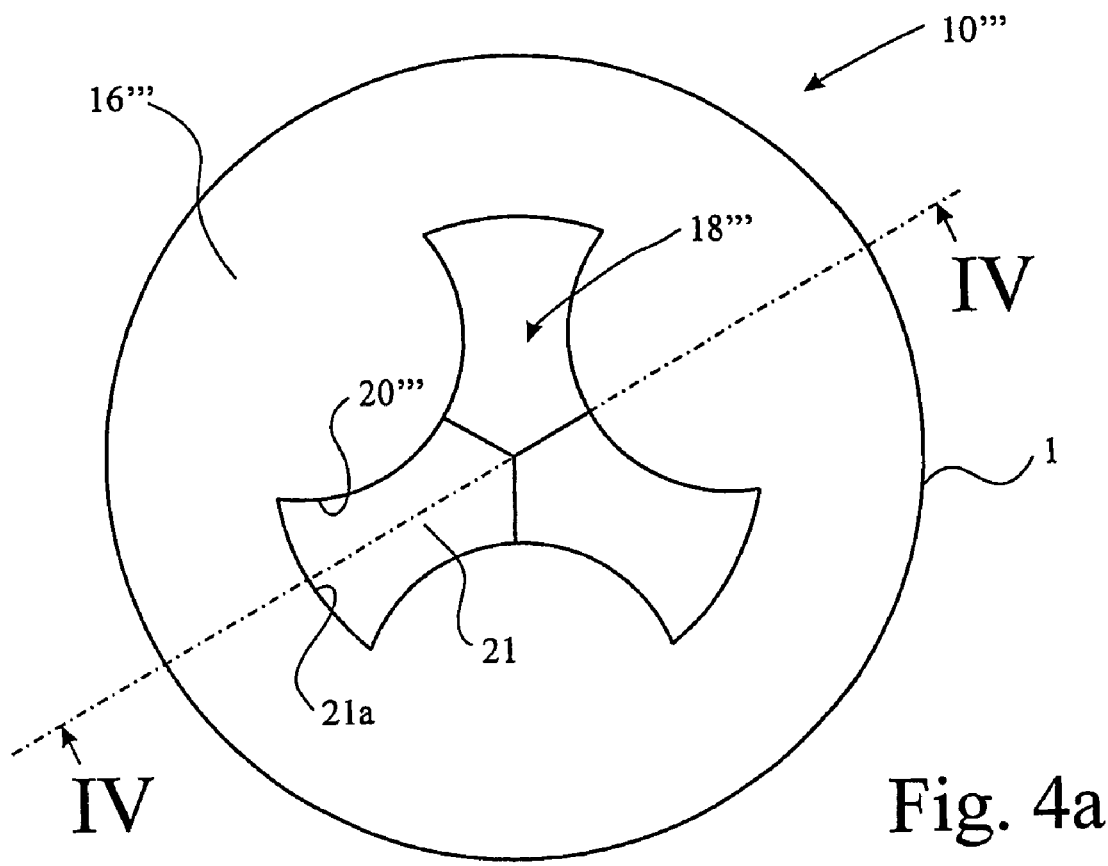
FIGS. 4a and b are similar views of a larger screw in the same size range as that of FIG. 1 (FIG. 4b being partly in section along the line IV—IV in FIG. 4a)
Figure 4B:
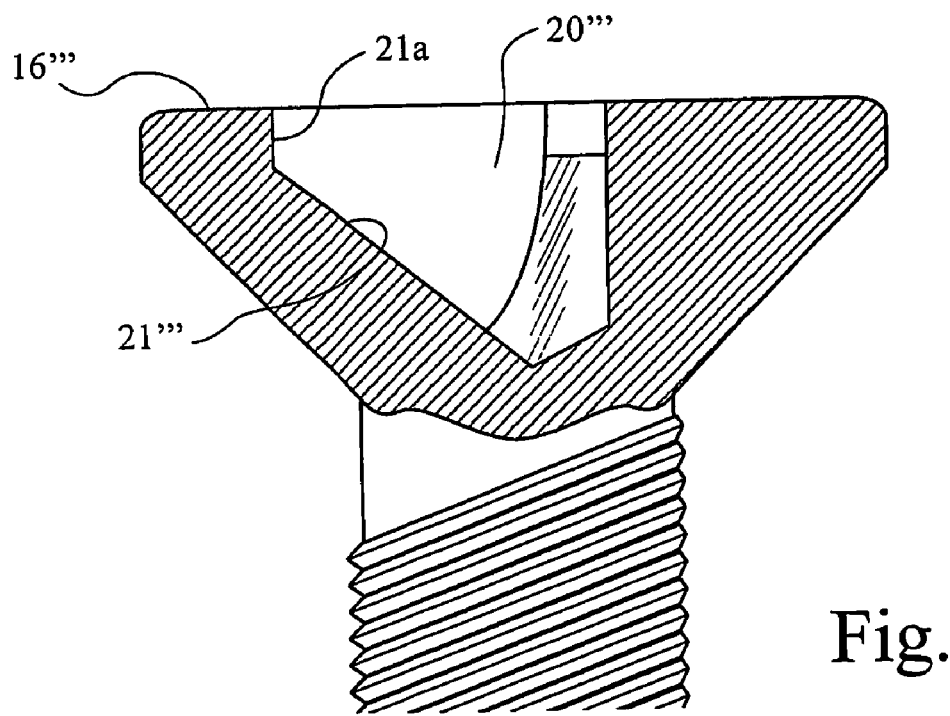

In the other direction, FIGS. 4a and b show a larger screw than that illustrated in FIG. 1, but still having the same recess. Except, here, the recess 18'" of the screw 10'" is set deeper into the head 14'", so that floors 21'" have a cylindrical section 21a(that is to say, perpendicular the top face 16'"). This increases the area of the driving surfaces of the flanges 20'" available for contact by the drive elements 118 of the driver 100.

Figure 6:
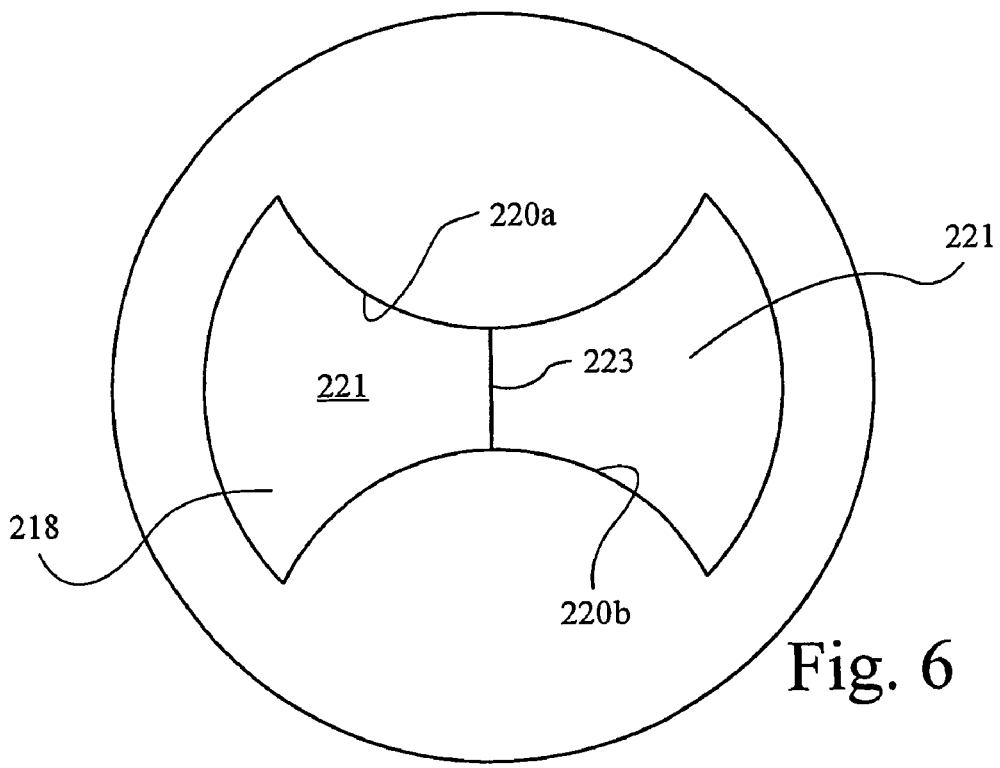
FIG. 6 is a top view of a different embodiment of screw in accordance with the present invention and having two lobe-recesses.
Figure 7:
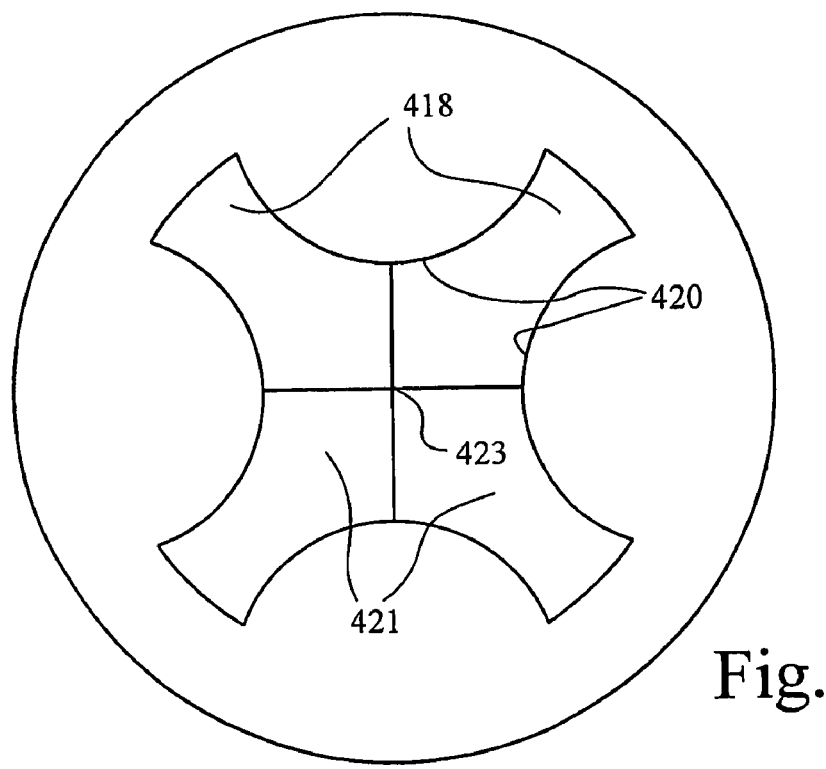
FIG. 7 is a top view of another different embodiment of screw in accordance with the present invention, having four lobe-recesses.

Finally, FIGS. 6 and 7 show two alternative arrangements that benefit, to a certain extent, from the same advantages provided by the present invention, but which are not particularly preferred. In FIG. 6, just two driving flanges 220a,b are provided, the floor 221 of the lobe-recesses 218 between them meeting at a line 223. In FIG. 7, four lobe-recesses 418 and driving flanges 420 are provided. The floors 421 between the flanges meet at a four-edged point 423.

The invention claimed is:

1. A screw having a driving recess in a top face of its head, the recess comprising at least two recess-lobes evenly spaced around a longitudinal axis of the screw, and driving flanges joining adjacent lobes, wherein each flange in transverse section is an arc convex with respect to the longitudinal axis, has sides which are parallel said longitudinal axis and has a tangent which is radial with respect to said longitudinal axis, the floor of said recess-lobes being inwardly inclined from their junctions with said top face towards said longitudinal axis.

2. A screw as claimed in claim 1, in which said arc is substantially circular.

3. A screw as claimed in claim 2, in which the radius of each arc is between 60 and 80% of the radius of the lobes.

4. A screw as claimed in claim 3, in which the radius of each arc is between 66% and 68% of the radius of the lobes.

5. A screw as claimed in claim 1, in which said tangent is radial at a distance from where the arc meets each lobe.

6. A screw as claimed in claim 1, in which the lobes are part-circular in section at their junctions with said top face, centred on the longitudinal axis.

7. A screw as claimed in claim 1, in which the centre of each arc is on a circle that is centred on the longitudinal axis, the radius of which circle is the same as or greater than the radius of the lobes.

8. A screw as claimed in claim 1, in which there are three of said recess-lobes.

* * * * *